United States Patent
Kotler et al.

(10) Patent No.: US 12,204,228 B2
(45) Date of Patent: Jan. 21, 2025

(54) HIGH-SPEED DYNAMIC BEAM SHAPING

(71) Applicant: Orbotech Ltd., Yavne (IL)

(72) Inventors: Zvi Kotler, Tel Aviv (IL); Yuval Berg, Tel Aviv (IL)

(73) Assignee: Orbotech Ltd., Yavne (IL)

( * ) Notice: Subject to any disclaimer, the term of this patent is extended or adjusted under 35 U.S.C. 154(b) by 691 days.

(21) Appl. No.: 17/423,471

(22) PCT Filed: Feb. 27, 2020

(86) PCT No.: PCT/IL2020/050223
§ 371 (c)(1),
(2) Date: Jul. 15, 2021

(87) PCT Pub. No.: WO2020/178813
PCT Pub. Date: Sep. 10, 2020

(65) Prior Publication Data
US 2022/0121082 A1    Apr. 21, 2022

Related U.S. Application Data

(60) Provisional application No. 62/814,311, filed on Mar. 6, 2019.

(51) Int. Cl.
*G02F 1/33*    (2006.01)
*B23K 26/06*   (2014.01)
(Continued)

(52) U.S. Cl.
CPC .............. *G02F 1/33* (2013.01); *B23K 26/064* (2015.10); *B23K 26/0665* (2013.01); *B23K 26/073* (2013.01); *G02B 27/0944* (2013.01)

(58) Field of Classification Search
CPC ... G02F 1/33; G02B 27/0944; G02B 27/0927; G02B 27/0933; G02B 27/48
See application file for complete search history.

(56) References Cited

U.S. PATENT DOCUMENTS 10,444,526 B2    10/2019  Wilcox
2003/0047546 A1   3/2003  Gross et al.
(Continued)

FOREIGN PATENT DOCUMENTS

CN    1881064 A    12/2006
CN    102554467 A   7/2012
(Continued)

OTHER PUBLICATIONS

CNIPA, Office Action for CN Application No. 202080018416.X, Feb. 16, 2023 (see X/Y/A designations on pp. 7-8).
(Continued)

*Primary Examiner* — Joseph P Martinez
(74) *Attorney, Agent, or Firm* — Hodgson Russ LLP

(57) ABSTRACT

Optical apparatus (20) includes a laser (22), which is configured to emit a beam of coherent optical radiation at a specified wavelength along a beam axis. A deflector (24) is configured to intercept and selectably deflect the beam over a range of angles relative to the beam axis. A plurality of diffractive optical elements (DOEs—32, 34, 36, 64, 66, 68) are positioned to receive the deflected beam at different, respective deflection angles within the range and to output respective diffracted beams. Beam-combining optics (42, 74) are configured to receive and deflect the diffracted beams from the DOEs so that all of the diffracted beams are directed along a common output axis toward a target (48).

29 Claims, 5 Drawing Sheets

(51) Int. Cl.
  *B23K 26/064* (2014.01)
  *B23K 26/073* (2006.01)
  *G02B 27/09* (2006.01)

(56) References Cited

U.S. PATENT DOCUMENTS

| | | |
|---|---|---|
| 2010/0301024 A1 | 12/2010 | Unrath |
| 2011/0297851 A1 | 12/2011 | Lauer et al. |
| 2017/0082845 A1 | 3/2017 | Chen et al. |

FOREIGN PATENT DOCUMENTS

| | | | |
|---|---|---|---|
| CN | 107003530 A | 8/2017 | |
| EP | 3346314 * | 7/2018 | ............. G02B 27/09 |
| EP | 3346314 A1 | 7/2018 | |
| WO | 2016075681 A1 | 5/2016 | |

OTHER PUBLICATIONS

Akemann et al., "Fast spatial beam shaping by acousto-optic diffraction for 3D non-linear microscopy," Optics Express, 2015, vol. 23, No. 22, 15 pages.

WIPO, International Search Report for PCT/IL2020/050223, May 27, 2020.

Vanderlugt et al., "Design relationships for acousto-optic scanning systems," Applied Optics, Jul. 10, 1992, pp. 4058-4068, vol. 31, No. 20.

Bechtold et al., "Beam shaping and high-speed, cylinder-lens-free beam guiding using acousto-optical deflectors without additional compensation optics," Optics Express, Jun. 12, 2013, pp. 14627-14635, vol. 21, Issue 12.

Hecht, "Multifrequency Acoustooptic Diffraction," IEEE Transactions on Sonics and Ultrasonics, Jan. 1977, pp. 7-18, vol. SU-24, No. 1.

Antonov et al., "Efficient Multiple-Beam Bragg Acoustooptic Diffraction with Phase Optimization of a Multifrequency Acoustic Wave," Technical Physics, 2007, pp. 1053-1060, vol. 52, No. 8.

Peled et al., "Acousto-optics bandwidth broadening in a Bragg cell based on arbitrary synthesized signal methods," Applied Optics, Jun. 1, 2015, pp. 5065-5073, vol. 54, No. 16.

CNIPA, Office Action issued for CN Application No. 202080018416.X, Sep. 23, 2023.

Kai Erik Peiponen et al., "Optical Measurement Techniques," 2009.

* cited by examiner

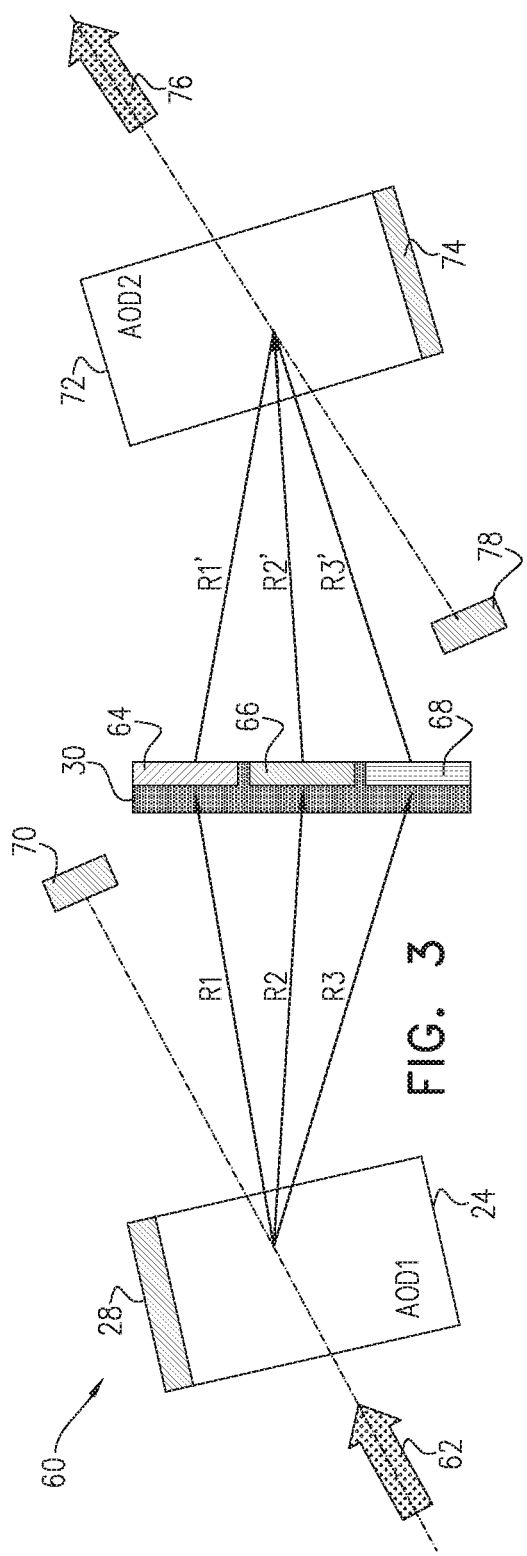
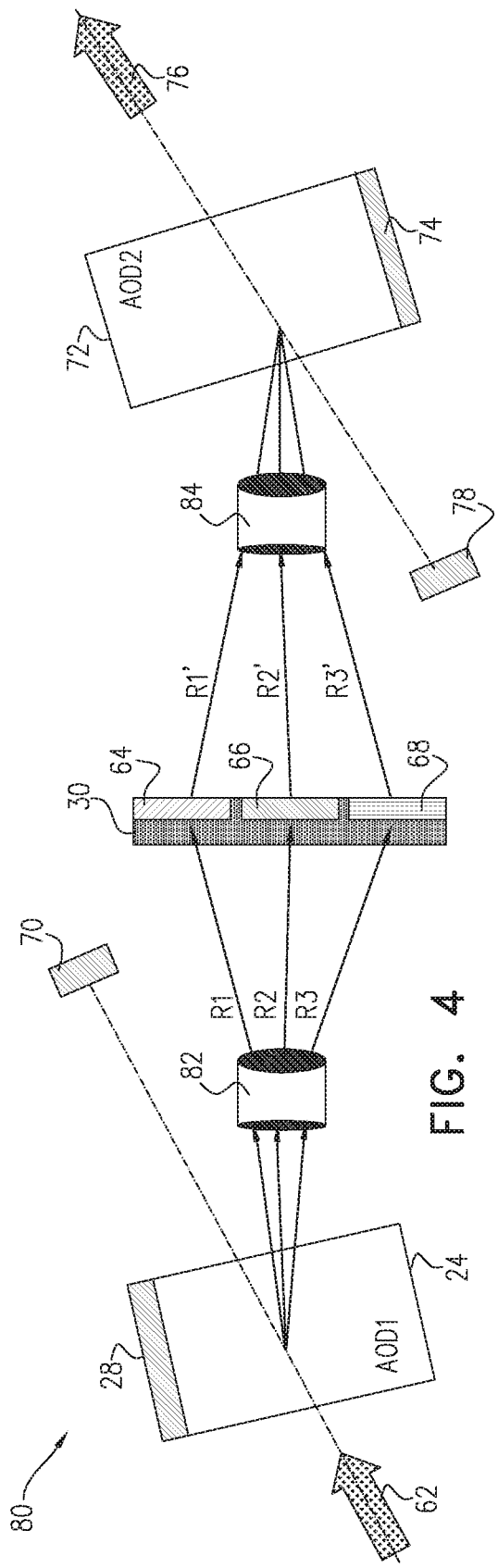

HIGH-SPEED DYNAMIC BEAM SHAPING

CROSS-REFERENCE TO RELATED APPLICATION

This application claims the benefit of U.S. Provisional Patent Application 62/814,311, filed Mar. 6, 2019, which is incorporated herein by reference.

FIELD OF THE INVENTION

The present invention relates generally to optical devices and systems, and particularly to methods and apparatus for spatial and temporal beam shaping.

BACKGROUND

In laser micro-machining, a train of laser pulses is applied to a workpiece, for example to ablate or otherwise remove material from a substrate in a predefined manner, or to modify the physical properties of a material by melting, sintering, or crystalizing it. To achieve the desired results, the laser beam must have well-controlled shape, timing and energy properties.

Laser drilling applications, for example of printed circuit board (PCB) substrates, rely on the shape of the laser beam to achieve optimal results. To obtain via holes of high aspect ratio, beam shapes with a flat-top profile are preferred over Gaussian beams. When the laser drilling process involves multiple materials, each with its own physical properties, optimal processing may require adapting the beam shape and energy for each material.

Diffractive optical elements (DOEs) are used in a variety of applications for shaping, splitting and combining beams of laser radiation. For example, U.S. Pat. No. 10,444,526 describes an optical system that includes a plurality of optical sources, a first diffractive optical element, and a second diffractive optical element. The plurality of optical sources generates a plurality of pulsed beams that is less than about 1 picosecond in duration. The first diffractive optical element receives and diffracts the plurality of pulsed beams. The second diffractive optical element receives the diffracted plurality of pulsed beams and generates a combined pulsed beam.

SUMMARY

Embodiments of the present invention that are described hereinbelow provide improved devices and methods for optical beam shaping.

There is therefore provided, in accordance with an embodiment of the invention, optical apparatus, including a laser, which is configured to emit a beam of coherent optical radiation at a specified wavelength along a beam axis. A deflector is configured to intercept and selectably deflect the beam over a range of angles relative to the beam axis. A plurality of diffractive optical elements (DOEs) are positioned to receive the deflected beam at different, respective deflection angles within the range and to output respective diffracted beams. Beam-combining optics are configured to receive and deflect the diffracted beams from the DOEs so that all of the diffracted beams are directed along a common output axis toward a target.

In a disclosed embodiment, the plurality of DOEs include a single substrate having any array of different diffractive patterns disposed thereon so as to define the plurality of the DOEs.

In some embodiments, the DOEs are configured to apply different, respective spatial intensity profiles to the respective diffracted beams. Additionally or alternatively, the DOEs are configured to direct the respective diffracted beams at different, respective output angles so that the diffracted beams converge at the beam-combining optics. In one embodiment, the beam-combining optics include a DOE.

In some embodiments, the deflector includes an acousto-optic device and a drive circuit, which is coupled to apply to the acousto-optic device a drive signal having a frequency that is selectable so as to cause the acousto-optic device to deflect the beam selectably toward each of the DOEs. In one embodiment, the acousto-optic device is configured to deflect the beam over a first range of angles, and the deflector includes beam-expanding optics, which are positioned between the acousto-optic device and the DOEs and are configured to expand the first range into a second range that encompasses the respective deflection angles of all the DOEs.

Additionally or alternatively, the acousto-optic device in the deflector is a first acousto-optic deflector, and the beam-combining optics include a second acousto-optic deflector, which is driven in synchronization with the first acousto-optic deflector to deflect the diffracted beams in a direction along the common output axis. In one embodiment, the second acousto-optic deflector is configured to scan the output axis so that the diffracted beams impinge on multiple different points on the target.

In some embodiments, the drive circuit is configured to apply the drive signal at two or more frequencies simultaneously, which causes the acousto-optic device to split the beam into two or more sub-beams at the respective deflection angles of two or more of the DOEs. In a disclosed embodiment, the beam-combining optics are configured to recombine the sub-beams to impinge together along the common output axis on the target after diffraction from the DOEs. The drive circuit can be configured to adjust a temporal intensity profile of the recombined sub-beams by varying a phase difference between the two or more frequencies and/or by varying respective amplitudes of the two or more frequencies in the drive signal.

In a disclosed embodiment, the drive circuit is configured to switch the frequency of the drive signal, so as to switch an angle of deflection of the beam among the DOEs, within a switching time that is less than 10 µs.

There is also provided, in accordance with an embodiment of the invention, an optical method, which includes directing a beam of coherent optical radiation at a specified wavelength along a beam axis. The beam is selectably deflected over a range of angles relative to the beam axis so as to generate one or more deflected beams at different, respective deflection angles, which are selected within the range so that the one or more deflected beams impinge respectively on one or more diffractive optical elements (DOEs), among a plurality of DOEs, whereby the one or more DOEs output respective diffracted beams. the diffracted beams from the DOEs are deflected so that all of the diffracted beams are directed along a common output axis toward a target.

There is additionally provided, in accordance with an embodiment of the invention, optical apparatus, including a laser, which is configured to emit a beam of coherent optical radiation at a specified wavelength along a beam axis. An acousto-optic device is configured to intercept and selectably deflect the beam over a range of angles relative to the beam axis. A drive circuit is coupled to apply to the acousto-optic device a drive signal at two or more frequencies simultaneously, so as to cause the acousto-optic device to split the beam into two or more sub-beams at different, respective deflection angles. A plurality of deflecting elements are positioned to receive the sub-beams at the different, respective deflection angles within the range and to direct the sub-beams toward a common intersection point. Beam-combining optics are configured to receive the sub-beams at the common intersection point from the deflecting elements and to recombine the sub-beams into an output beam, which impinges along a common output axis on a target.

In some embodiments, the drive circuit is configured to adjust a temporal intensity profile of the recombined sub-beams by varying a phase difference between the two or more frequencies and/or by varying respective amplitudes of the two or more frequencies in the drive signal. Additionally or alternatively, the drive circuit is configured to adjust a temporal intensity profile of the recombined sub-beams by switching the frequencies of the drive signal, so as to switch the deflection angles of the sub-beams. In a disclosed embodiment, the deflecting elements include diffractive optical elements (DOEs).

The present invention will be more fully understood from the following detailed description of the embodiments thereof, taken together with the drawings in which:

BRIEF DESCRIPTION OF THE DRAWINGS

FIGS. 3 and 4 are schematic side view of beam shaping assemblies, in accordance with embodiments of the invention.

DETAILED DESCRIPTION OF EMBODIMENTS

Overview

Figure 1:
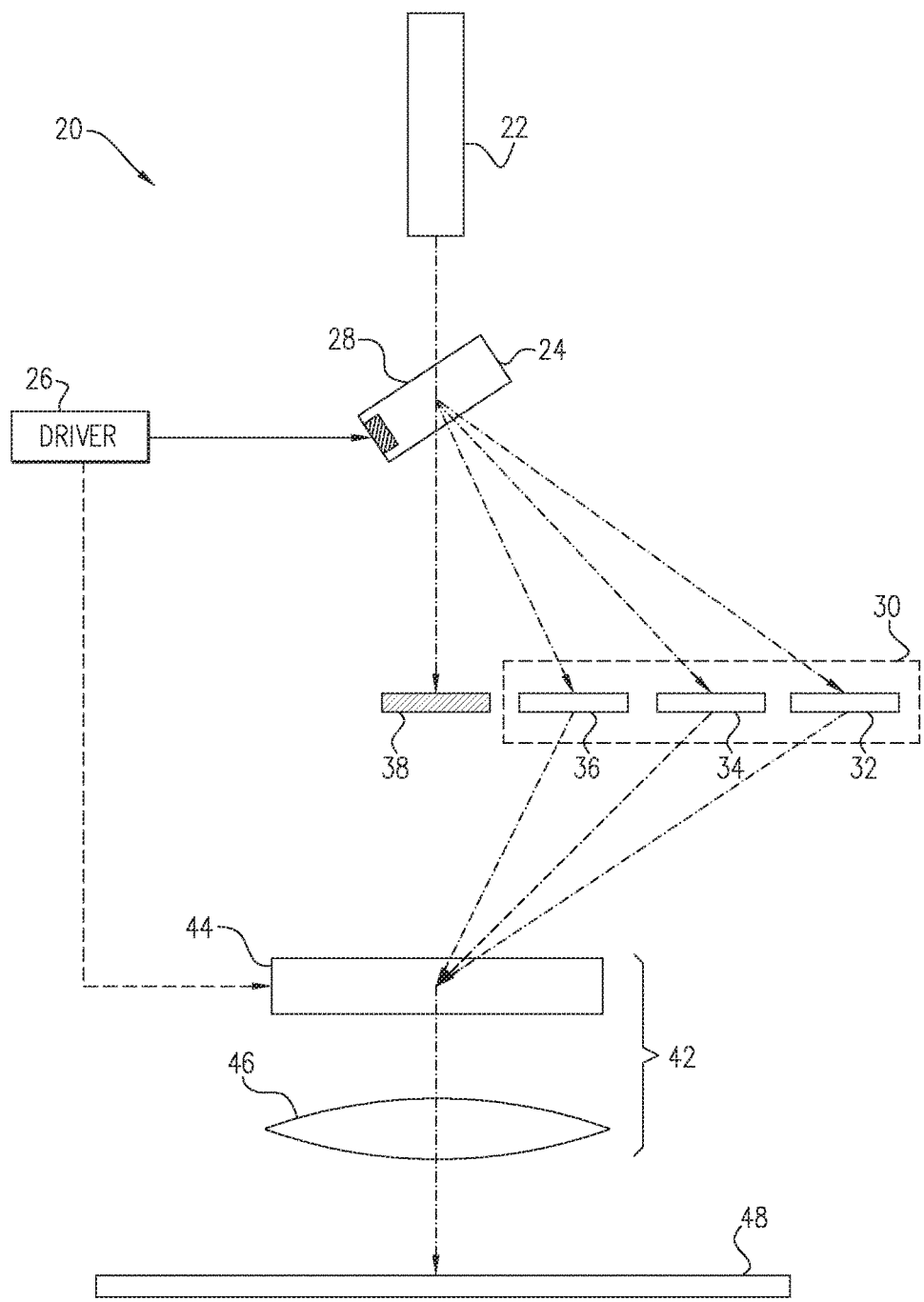
FIG. 1 is schematic side view of a system for laser micro-machining, in accordance with an embodiment of the invention.

In some laser processing applications, features of the laser beam such as the spatial and temporal shapes of the laser pulses are switched among different profiles in the course of machining a given workpiece. For example, when a laser drilling process penetrates through multiple layers, each with its unique physical properties, it may be desirable to alter the beam shape and intensity for each successive layer in the stack. In such cases, an adaptive mechanism, permitting on-the-fly manipulation of the beam shape, would be beneficial. This sort of adaptive beam shaping can also be useful in other applications, such as laser microscopy and material manipulation using optical tweezers.

Embodiments of the present invention provide methods and apparatus for dynamically changing the spatial profile of an input laser beam into any one of a number of different output beam profiles. Such changes can be made in an arbitrary manner, i.e., from any profile to any other profile in the set, with fast switching times between the different profiles, typically less than 10 µs, and possibly as short as 1 µs.

The disclosed embodiments make use of an array of diffractive optical elements (DOEs), which apply different, respective spatial phase transformations to the received beam. The term DOE is used in the present description and in the claims in accordance with its customary meaning in the art, to refer to an optical element having a micro-structure pattern that is designed to alter the phase profile of incident optical radiation by diffraction from the pattern. "Optical radiation" refers to electromagnetic radiation in any of the infrared, visible, and ultraviolet wavelength ranges. The diffractive pattern on the DOE is a "micro-structure" in the sense that the gradient of thickness or phase of the pattern varies on a scale that is on the order of the wavelength of the radiation that the DOE is designed to diffract. The array of DOEs used in embodiments of the present invention may comprise physically separate substrates, each with its own diffractive pattern, or equivalently, multiple diffractive patterns formed side-by-side on the same substrate. DOEs are most commonly produced by processes of photolithographic etching and/or stamping; but other sorts of DOEs, such as holographic optical elements, are also within the scope of the present invention.

In the disclosed embodiments, a laser emits a beam of coherent radiation at a specified wavelength along a beam axis toward a deflector, which selectably deflects the beam over a range of angles relative to the beam axis. Multiple DOEs are positioned to receive the deflected beam at different, respective deflection angles within the range, and output respective diffracted beams. Beam-combining optics receive the diffracted beams from the DOEs and deflect the diffracted beams so that all the beams are directed along a common output axis toward a target.

To facilitate this beam-combining process, the DOEs in some embodiments are designed to direct the respective diffracted beams at different, respective output angles so that the diffracted beams converge at the beam-combining optics. Alternatively or additionally, the beam-combining optics may comprise dedicated optical components, such as refractive, reflective and/or additional diffractive elements, for this purpose.

In some embodiments, the DOEs have different, respective diffraction patterns, which are designed to apply different, respective spatial intensity profiles to the respective diffracted beams. The desired spatial intensity can thus be selected and switched by operating the deflector to direct the beam toward the appropriate DOE at each point in the process. This use of an array of DOEs in shaping the laser beam is advantageous, inter alia, in that the beam profile is stationary and invariant for as long as the deflected beam is directed toward a given DOE and is precisely repeatable each time the given DOE is selected. By comparison, techniques of acousto-optic and electro-optic beam shaping that are known in the art are subject to temporal and optical variations that can be difficult to control.

Some embodiments of the present invention use deflectors that are capable of splitting the input beam from the laser into two or more sub-beams at the respective deflection angles of two or more of the DOEs, which thus receive the respective sub-beams simultaneously. In this case, the beam-combining optics will recombine the sub-beams so that they impinge together on the target after diffraction from the DOEs. The spatial characteristics of the recombined beam in this case will be a combination of the spatial and temporal intensity profiles of the participating DOEs. This approach can be used in controlling both spatial and temporal intensity profiles of the recombined beam (as explained in detail hereinbelow).

The deflector may comprise any suitable sort of controllable optical deflector that is known in the art, such as a scanning mirror or prism with a control circuit for setting the deflection angle. The embodiments described below, however, use an acousto-optic deflector, with a drive circuit that applies a drive signal to the acousto-optic deflector at a frequency or frequencies that are selectable so as to cause the device to deflect the beam selectably toward each of the DOEs. This sort of deflector is advantageous is enabling both precise beam control and fast switching among the DOEs. The drive circuit may apply the drive signal at two or more frequencies simultaneously, which causes the acousto-optic deflector to split the beam into two or more sub-beams at the respective deflection angles of two or more of the DOEs. The drive circuit can vary the amplitudes and phases of the different frequency components of the drive signal in order to control the relative amplitudes and phases of the sub-beams.

In some embodiments, the beam-combining optics comprise a second acousto-optic deflector, which deflect the diffracted beams in a direction along the common output axis. For this purpose, the second acousto-optic deflector is driven in synchronization with the acousto-optic deflector that deflects the input beam.

System Description

FIG. 1 is a schematic side view of a system 20 for laser micro-machining, in accordance with an embodiment of the invention. System 20 comprises a laser 22, which emit a beam of coherent optical radiation at a specified wavelength along a beam axis toward a deflector 24, which intercepts and selectably deflects the beam over a range of angles relative to the beam axis. The deflection angles are selected so that the deflected beam is directed toward one or more DOEs 32, 34, 36 . . . in an array 30. The undeflected part of the laser beam strikes a beam stop 38.

As noted earlier, array 30 may comprise a single substrate on which different diffractive patterns are formed at the respective locations of the DOEs; or alternatively, the DOEs may be formed on two or more separate substrates. Although DOEs 32, 34 and 36 are shown in FIG. 1 to be operating in a mode of transmission of the diffracted optical beams, the DOEs may alternatively output the diffracted beams in a reflection mode. Furthermore, although array 30 is shown in FIG. 1 as comprising three DOEs, in practice system 20 may comprise a larger or smaller number of DOEs, depending on application requirements and the resolution of deflector 24.

In the present embodiment and the description below, deflector 24 comprises an acousto-optic device (although other types of deflectors may alternatively be used, as noted above). Deflector 24 thus comprises an acousto-optic medium, for example a crystal of quartz or $TeO_2$. At least one piezoelectric transducer 28 is attached to the acousto-optic medium. A drive circuit 26 applies a drive signal to transducer 28 with a frequency that is selectable so as to cause the acousto-optic device to deflect the beam over a range of angles. Specifically, to direct a deflected beam at wavelength λ toward the ith DOE, at a deflection angle $\theta_{in,i}$ relative to the beam axis, drive circuit 26 applies a signal at frequency F, as given by:

$$\theta_{in,i} = \frac{\lambda \cdot F_i}{V_s}$$

wherein Vs is the speed of sound in the acousto-optic medium.

In some embodiments, drive circuit 26 applies multi-frequency signals to transducer 28, which include components at two or more frequencies simultaneously. These signals cause acousto-optic deflector 24 to split the input beam into two or more sub-beams at the respective deflection angles of two or more of the DOEs. This sort of multi-frequency operation, and the resulting split of the input beam into multiple output beams, is described, for example, in PCT International Publication WO 2016/075681, whose disclosure is incorporated herein by reference. For optimal efficiency of deflection, transducer 28 may advantageously comprise an array of multiple piezoelectric transducers attached to the acousto-optic medium. Drive circuit applies 26 respective drive signals to the piezoelectric transducers with multiple frequency components at different, respective frequencies and with different, respective phase offsets at each of the multiple piezoelectric transducers. The frequencies are selected so as to cause the acousto-optic medium to split the input beam into multiple output beams at respective beam angles that are determined by the corresponding frequencies. Techniques for selection and application of these multi-frequency drive signals are described at length in the PCT publication.

DOEs 32, 34, 36, . . . have respective diffractive patterns that are designed to impart a certain phase front to the beam that they receive, which will in turn give the beam a specified spatial intensity profile at the Fourier plane (typically at the point on a target 48 onto which the beam is focused). It is desirable that the DOEs also be configured as deflecting elements, i.e., that each DOE also include a prismatic component, in order to deflect the beam at a respective output angle, $\square_{out,i}$, which is chosen so as to cause the diffracted beams to converge. DOEs with these properties can be supplied commercially by a number of vendors, for example HOLO/OR Ltd. (Nes Ziona, Israel). In the pictured embodiment, the output angles are chosen such that for each DOE, $\square_{out,i} = \square\square_{in,i}$. Thus, the beams emerging from the respective DOEs will all converge and intersect at a point in space that is a conjugate point of deflector 24.

Beam-combining optics 42 receive and deflect the diffracted beams from DOEs 32, 34, 36, . . . so that all of the diffracted beams are directed along a common output axis toward target 48. In some embodiments, for example, target 48 comprises a workpiece in which the laser beam drills holes or performs other sorts of micro-machining operations. In the pictured embodiment, the beam-combining optics comprise a deflector 44, which deflects each of output beams by an angle equal to $-\square_{out,i}$, so that all of the beams are aligned along the same axis. Alternatively, other angular configurations may be used in combining the beams. In the embodiments that are described below, deflector 44 comprises a second acousto-optic deflector, which is driven in synchronization with deflector 24. Alternatively, deflector 44 may comprise any other suitable type of active or passive element, such as a DOE with a grating structure designed so that the beams that are incident on the DOE from all of the angles $\{_{out,i}\}$ exit the DOE along the same axis toward target 48, as shown in FIG. 1.

Beam-combining optics 42 typically comprise additional optical elements, such as a focusing lens 46, which focuses the diffracted output beam onto target 48. Alternatively or additionally, beam-combining optics 42 may comprise other elements, such as an output beam scanner, to scan the output axis so that the diffracted beams impinge on multiple different points on target 48. This scanning functionality may be implemented, at least in part, by deflector 44.

Figure 2A:
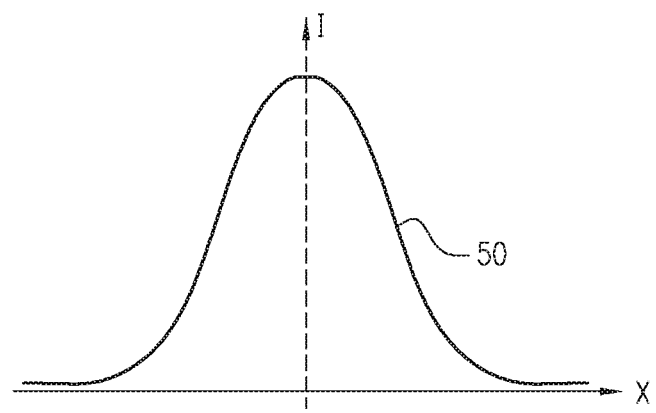
FIGS. 2A, 2B and 2C are schematic plots of laser beam spatial profiles generated in the system of FIG. 1, in accordance with an embodiment of the invention.
Figure 2B:
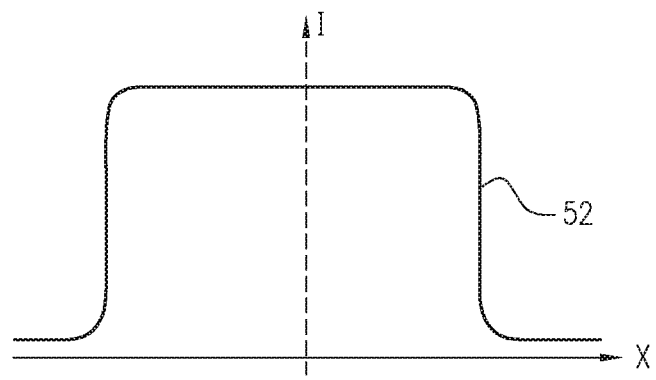
Figure 2C:
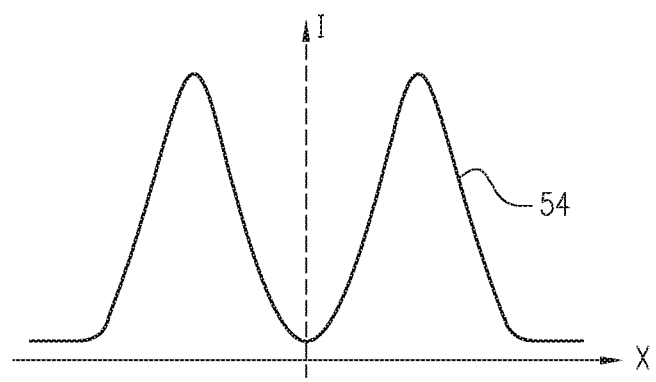

FIGS. 2A, 2B and 2C are schematic plots of laser beam spatial intensity profiles 50, 52 and 54, respectively, which are generated on target 48 in system 20, in accordance with an embodiment of the invention. Each of these spatial intensity profiles is applied by a different one of DOEs 32, 34, 36, . . . , to the respective diffracted beam. For example, profile 50 is Gaussian, while profile 52 is a top-hat profile, and profile 54 corresponds to a ring-shaped beam (seen in cross-section in FIG. 2C). The DOEs may be designed, using methods of computation and photolithography that are known in the art, to generate a wide range of different spatial profiles.

Acousto-optic deflector 24 is able to switch the deflected beam among the DOEs, and thus switch the spatial profile of the beam on target 48, with a switching time that depends on the bandwidth of the acousto-optic device. This switching time is typically less than 10 μs, and with a high-bandwidth acousto-optic device may be as short as 1 μs or less. Thus, even when laser 22 has a high pulse repetition rate, system 20 is able to switch the beam profile on target 48 from pulse to pulse.

The range of spatial profiles may be expanded still further by directing diffracted sub-beams simultaneously through two or more of the DOEs, leading to superposition of their respective spatial intensity profiles. Spatial interference among the complex amplitude profiles of the sub-beams may play a further role in shaping the spatial intensity profile. The use of this sort of interference for temporal beam shaping is described below, but the same principles may be applied, mutatis mutandis, in the spatial domain or in both the spatial and temporal domains to obtain spatio-temporal pulse shaping.

Acousto-Optic Beam Deflection

FIG. 3 is a schematic side view of a beam-shaping assembly 60, in accordance with an embodiment of the invention. The elements of this assembly may take the place of deflector 24, array 30, and deflector 44 in system 20 (FIG. 1). Acousto-optic deflector (AOD) 24 deflects an input beam 62 into one or more deflected beams at different angles, labeled R1, R2 and R3, which are then incident on respective DOEs 64, 66 and 68. As noted earlier, the frequency of the drive signal that is applied to piezoelectric transducer 28 is selectable so as to cause deflector 24 to deflect the beam toward each of the DOEs; and the amplitude and phase of each drive signal component can be set so as to control the amplitude and phase of each of beams R1, R2 and R3. The undeflected part of input beam 62 strikes a beam stop 70.

The diffracted beams that are transmitted by DOEs 64, 66 and 68, labeled R1', R2' and R3', converge at a point in a second AOD 72, which combines the diffracted beams into an output beam 76 along the axis to the target. The DOEs are designed so that for each DOE, the input and output angles are equal and opposite: $\Box_{out,i} = \Box\Box_{in,i}$, as explained above. To recombine the diffracted beams, a piezoelectric transducer 74 is driven (for example by drive circuit 26 in FIG. 1) in synchronization with AOD 24 and with the same frequency components as AOD 24. A beam stop 78 blocks back-reflections. As noted earlier, drive circuit 26 may apply the drive signal at two or more frequencies simultaneously, which causes AOD 24 to split input beam 62 into two or more sub-beams at the respective deflection angles of two or more of DOEs 64, 66 and 68. In this case, AOD 72 will be driven to recombine the diffracted sub-beams into output beam 76.

In practical terms, the number of distinguishable deflected beams R1, R2, R3, . . . , in beam-shaping assembly 60 is determined by the number of resolution points N of AOD 24, which is given by:

$$N = \frac{\pi \cdot D \cdot \Delta F}{4 \cdot V_S}$$

In this formula, D is the diameter of beam 62, and ΔF is the size of the frequency steps. Although it is possible in principle to fabricate DOEs 64, 66 and 68 in array 30 with overlap between the respective grating patterns, in practice the beam-shaping results will be more precise when the DOEs are spatially separated from one another.

For an array of N DOEs of this sort, the separation distance L between AOD 24 and array 30 is given by:

$$L = \frac{D \cdot (N-1)}{\Delta \theta}$$

In this formula, Δθ is the angular separation between adjacent deflected beams R1, R2, . . . , $R_N$. This formula shows that to minimize the size of assembly 60, as well as maximizing the rate at which AOD 24 can be switched among the different DOEs 64, 66, 68, the diameter D should be made as small as possible.

On the other hand, if the beam diameter D is made too small, there is a risk of damage to AOD 24 and to DOEs 64, 66, 68. This lower limit on the beam diameter also imposes a lower limit on the size of assembly 60 and an upper limit on the rate at which AOD 24 can be switched. The size limitation can be relaxed by increasing the angular separation Δθ between adjacent deflected beams and the corresponding DOEs, which reduces the distance L (but also reduces the number of different DOEs that can be accommodated).

In some embodiments, AOD 72 is additionally controlled so as to scan the output axis of system 20, i.e., to scan output beam 76 so that the diffracted beams from the DOEs in array 30 impinge on different points on target 48. For this purpose, for example, each of DOEs 64, 66, 68, . . . , can incorporate a cylindrical optical power, meaning that each DOE focuses the respective diffracted beam R1', R2', R3', . . . , in a manner that emulates a cylindrical lens with its cylinder axis perpendicular to the scan direction of AOD 24 (i.e., perpendicular to the page in the view shown in FIG. 3). Drive circuit 26 applies a frequency-chirped pulse to piezoelectric transducer 74, which causes AOD 72 to emulate a cylindrical lens with its cylinder axis perpendicular to that of the DOEs (i.e., in the plane of the page). In this manner, output beam 76 will be focused and scanned from point to point along target 48. The rate of scanning can be as fast as the rate of switching of the frequency applied to AODs 24 and 72. This mode of scanning can be used to change the focal point of output beam 76 on target from one pulse of laser 22 to the next, even with the laser operating at high repetition rates, in the hundreds of kilohertz.

A similar approach can be used to form multiple focal spots on target 48 simultaneously, at locations that are mutually offset. For this purpose, drive circuit 26 applies a multi-frequency signal to piezoelectric transducers 28 and 74, which causes AOD 24 to split input beam 62 into multiple sub-beams R1, R2, . . . , directed toward respective DOEs 64, 66, . . . . The multi-frequency signal applied to transducer 74 also includes a frequency chirp, as explained above, which will focus each diffracted sub-beam R1', R2', . . . , to a different, respective focal point on the target.

Shaping of Pulse Intensity Profiles

As explained above and illustrated in FIGS. 2A-2C, some embodiments of the present invention use the different spatial phase profiles of the DOEs in array 30 in order to vary the spatial intensity profiles of the laser pulses that are incident on target 48. To generate composite spatial intensity profiles, AOD 24 can be driven at two or more frequencies simultaneously in order to split the input beam into two or more sub-beams at the respective deflection angles of two or more of the DOEs, and the diffracted sub-beams are then recombined by AOD 72 in order to impinge together on the target.

Additionally or alternatively, drive circuit 26 can control and adjust the temporal intensity profile of the recombined sub-beams by varying the respective amplitudes and/or phases of the frequency components of the drive signal. The mechanism of control depends on the relation between the duration of the laser pulse and the optical path length difference between sub-beams R1, R2, . . . . In a typical implementation of system 20, these path length differences will be on the order of centimeters, meaning that the differences in time of flight of the optical pulses among the different sub-beams will be on the order of 100 ps or less.

Thus, when laser 22 emits pulses in the picosecond range, and drive circuit 26 applies a multi-frequency signal to AODs 24 and 72, the recombined output beam 76 will comprise a closely-spaced sequence of pulses, each transmitted through a different one of DOEs 64, 66, . . . . By appropriate design of the system geometry, pulse timing, and frequency components, this arrangement can be used to effectively extend the duration of very short input pulses. Furthermore, the respective amplitudes of the frequency components of the drive signal can be adjusted so that the extended output pulse or pulse sequence has a desired temporal intensity profile.

On the other hand, when laser 22 emits pulses in the nanosecond range, the output pulses in the diffracted sub-beams R1', R2', . . . , will overlap in time on target 48. In this case, the interference effects between the sub-beams may be used to advantage in shaping the spatial and/or temporal profile of the combined output beam 76. Specifically, the temporal frequency of each optical beam j that is deflected by AOD 24 will be shifted by an amount $\omega_j$, which is determined by the frequency $f_j$ of the corresponding component of the drive signal that drive circuit 26 applies to the AOD: $\omega_j = 2\pi f_j$, with a phase shift given by the relative phase of this component, $\phi_j$.

Assuming, for the sake of simplicity, that the drive signal is made up of a series of equally-spaced frequency components, with a spacing $\delta f$ between successive components, the intensity profile including interference effects will then have the form:

$$I_{out}(t) = I_{in}(t) \left| \sum_{j=1}^{n} c_j \cdot e^{-i(j \cdot \delta \omega \cdot t + \varphi_j)} \right|^2$$

The frequency increment $\delta f$ can be set to any desired value that is equal to or greater than the minimal resolvable diffraction limit of AOD 24: $\Box f \geq \Box Vs/D^2$. The values of amplitude $c_j$ and phase $\phi_j$ can be chosen so that the interference between the multiple beams at target 48 gives rise to a desired intensity profile.

In order for this sort of temporal intensity shaping to be effective, the frequency increment $\delta f$ and the laser pulse duration $\Delta t$ should satisfy the overlap relation: $\gamma \sim \Delta f \cdot \Delta \tau > \frac{1}{2}$. For example, using a laser pulse duration of 100 ns, and an AOD of moderate bandwidth (such as a deflector based on a TeO$_2$ crystal) having $\delta f = 20$ MHz, the overlap parameter will be $\gamma = 2$. In this case a variety of temporal beam patterns can be generated by combining up to three beams at different deflection angles. Faster temporal modulation can be achieved using acousto-optic devices with higher bandwidth, which will also enable a larger number of beams to be combined.

The embodiment described above is useful, inter alia, in enabling both the spatial and temporal profiles of the beam on target 48 to be controlled, using both the differing spatial phase profiles and the differing optical path lengths of the different DOEs. Alternatively, the principles of temporal shaping of the intensity profile that are described above, by combining multiple sub-beams with different optical path lengths and acousto-optic deflection frequencies, may be applied using other sorts of deflecting elements, even without the use of DOEs having different spatial phase profiles. For example, the DOEs in array 30 that are shown in the preceding figures may be configured simply to deflect the respective sub-beams while applying the same spatial profile to all sub-beams, or the DOEs may even be replaced by suitable refractive deflecting elements, such as prisms. These alternative means and methods for temporal intensity shaping are also within the scope of the present invention.

FIGS. 5A, 5B, 5C and 5D are schematic plots of laser beam temporal profiles generated on target 48 in system 20 by controlling the amplitudes and phases of the frequency components of the drive signal applied to the acousto-optic deflectors, in accordance with an embodiment of the invention. The units of time (horizontal axis) and intensity (vertical axis) are arbitrary, and the actual values will depend on the amplitude and temporal characteristics of the input laser beam, as well the spacing of the frequency components of the drive signal. The amplitudes $c_j$ of all the frequency components are assumed to be equal, although the relative phases are set so that the signs of some of the components are negative.

Figure 5A:
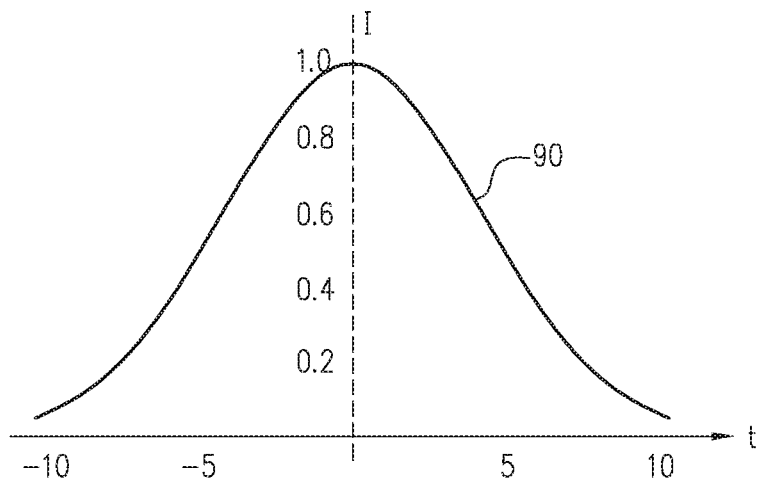
FIGS. 5A, 5B, 5C and 5D are schematic plots of laser beam temporal profiles generated in the system of FIG. 1, in accordance with an embodiment of the invention.
Figure 5B:
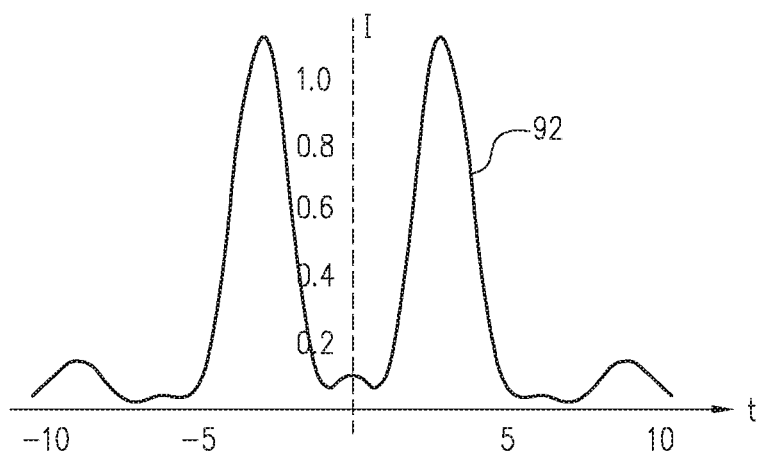

FIG. 5A shows a Gaussian beam profile 90 of input beams R1, R2 and R3. FIG. 5B represents a temporal intensity profile 92 that is generated by combining the frequency components j=1, 2, 3 with the following phases:

$$I_{out}(t) = I_{in}(t) |e^{i\delta \omega t - 1.54} - e^{2i\delta \omega t - 0.8} + e^{3i\delta \omega t - 0.6}|^2$$

As shown in FIG. 5B, this choice of phases creates two short pulses on target 48, separated by a short interval.

Figure 5C:
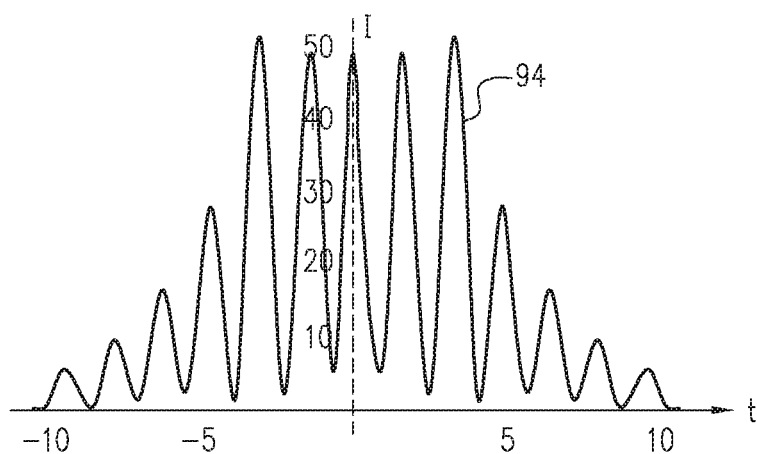

FIG. 5C shows a profile 94 that can be generated by addition of a frequency component at j=5, enabling system 20 to generate a longer train of short pulses. In this case, the frequency and phase relations are given by:

$$I_{out}(t) = I_{in}(t) |e^{i\delta \omega t + 1} - e^{2i\delta \omega t - 0.54} + e^{3i\delta \omega t - 1.54} + e^{5i\delta \omega t + 1.54}|^2$$

Figure 5D:
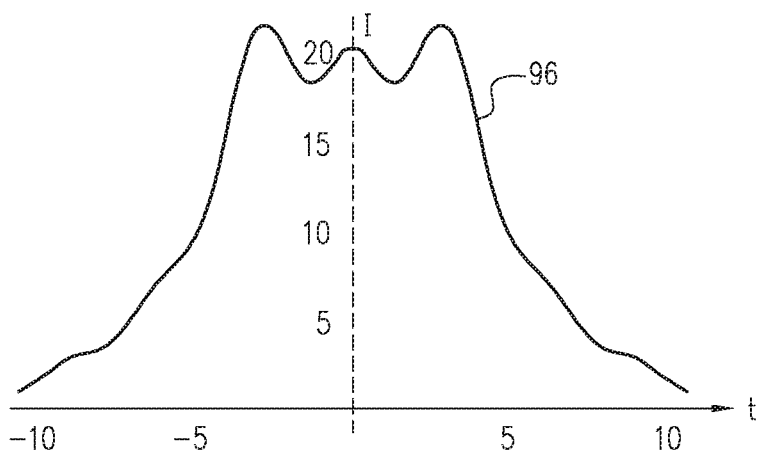

A similar approach can be used to generate an output pulse with a top-hat temporal profile 96, as shown in FIG. 5D, using the following phases:

$$I_{out}(t) = I_{in}(t) |e^{i\delta \omega t - 1.54} - e^{2i\delta \omega t - 1} + e^{3i\delta \omega t + 1.54}|^2$$

Drive signals for generating other sorts of temporal profiles will be apparent to those skilled in the art after reading the above description and are considered to be within the scope of the present invention.

Additionally or alternatively, the beams R1', R2', ..., that are output by DOEs 64, 66, ..., may be shaped spatially using the patterns on the DOEs (as shown in FIGS. 2B and 2C, for example), while the temporal profile of the beam on target 48 is controlled by setting the relative amplitudes and phases of the frequency components of the driving signal. This combined spatial and temporal approach may be applied to long laser pulses in generating the sorts of interference patterns that are described above, or to short laser pulses in order to produce a train of successive pulses on the target with varying intensity and spatial profiles.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical apparatus, comprising:
   a laser, which is configured to emit a beam of coherent optical radiation at a specified wavelength along a beam axis;
   a deflector, which is configured to intercept and selectably deflect the beam over a range of angles relative to the beam axis, wherein the deflector comprises an acousto-optic device and a drive circuit, and wherein the acousto-optic device in the deflector is a first acousto-optic deflector;
   a plurality of diffractive optical elements (DOEs), which are positioned to receive the deflected beam at different, respective deflection angles within the range and to output respective diffracted beams, wherein the drive circuit is coupled to apply to the acousto-optic device a drive signal having a frequency that is selectable so as to cause the acousto-optic device to deflect the beam selectably toward each of the DOEs; and
   beam-combining optics, which are configured to receive and deflect the diffracted beams from the DOEs so that all of the diffracted beams are directed along a common output axis toward a target, wherein the beam-combining optics comprise a second acousto-optic deflector, which is driven in synchronization with the first acousto-optic deflector to deflect the diffracted beams in a direction along the common output axis.

2. The apparatus according to claim 1, wherein the plurality of DOEs comprise a single substrate having any array of different diffractive patterns disposed thereon so as to define the plurality of the DOEs.

3. The apparatus according to claim 1, wherein the DOEs are configured to apply different, respective spatial intensity profiles to the respective diffracted beams.

4. The apparatus according to claim 1, wherein the DOEs are configured to direct the respective diffracted beams at different, respective output angles so that the diffracted beams converge at the beam-combining optics.

5. The apparatus according to claim 1, wherein the beam-combining optics comprise a DOE.

6. The apparatus according to claim 1, wherein the acousto-optic device is configured to deflect the beam over a first range of angles, and wherein the deflector comprises beam-expanding optics, which are positioned between the acousto-optic device and the DOEs and are configured to expand the first range into a second range that encompasses the respective deflection angles of all the DOEs.

7. The apparatus according to claim 1, wherein the second acousto-optic deflector is configured to scan the common output axis so that the diffracted beams impinge on multiple different points on the target.

8. The apparatus according to claim 1, wherein the drive circuit is configured to apply the drive signal at two or more frequencies simultaneously, which causes the acousto-optic device to split the beam into two or more sub-beams at the respective deflection angles of two or more of the DOEs.

9. The apparatus according to claim 8, wherein the beam-combining optics are configured to recombine the sub-beams to impinge together along the common output axis on the target after diffraction from the DOEs.

10. The apparatus according to claim 9, wherein the drive circuit is configured to adjust a temporal intensity profile of the recombined sub-beams by varying a phase difference between the two or more frequencies.

11. The apparatus according to claim 9, wherein the drive circuit is configured to adjust a temporal intensity profile of the recombined sub-beams by varying respective amplitudes of the two or more frequencies in the drive signal.

12. The apparatus according to claim 1, wherein the drive circuit is configured to switch the frequency of the drive signal, so as to switch an angle of deflection of the beam among the DOEs, within a switching time that is less than 10 us.

13. An optical method, comprising:
   directing a beam of coherent optical radiation at a specified wavelength along a beam axis;
   selectably deflecting the beam over a range of angles relative to the beam axis so as to generate one or more deflected beams at different, respective deflection angles, which are selected within the range so that the one or more deflected beams impinge respectively on one or more diffractive optical elements (DOEs), among a plurality of DOEs, whereby the one or more DOEs output respective diffracted beams; and
   deflecting the diffracted beams from the DOEs so that all of the diffracted beams are directed along a common output axis toward a target, wherein the beam is deflected by an acousto-optic device, and wherein selectively deflecting the beam comprises selecting a frequency of a drive signal that is applied to the acousto-optic device so as to cause the acousto-optic device to deflect the beam selectably toward each of the DOEs, wherein the acousto-optic device that selectively deflects the beam is a first acousto-optic deflector, and wherein deflecting the diffracted beams comprises driving a second acousto-optic deflector in synchronization with the first acousto-optic deflector to deflect the diffracted beams in a direction along the common output axis.

14. The method according to claim 13, wherein the plurality of DOEs comprise a single substrate having any array of different diffractive patterns disposed thereon so as to define the plurality of the DOEs.

15. The method according to claim 13, wherein the DOEs are configured to apply different, respective spatial intensity profiles to the respective diffracted beams.

16. The method according to claim 13, wherein the DOEs are configured to direct the respective diffracted beams at different, respective output angles so that the diffracted beams converge at beam-combining optics, which deflect the diffracted beams from the DOEs along the common output axis toward the target.

17. The method according to claim 13, wherein the diffracted beams are deflected along the common output axis by the DOEs.

18. The method according to claim 13, wherein the acousto-optic device is configured to deflect the beam over a first range of angles, and wherein selectively deflecting the beam comprises positioning beam-expanding optics between the acousto-optic device and the DOEs so as to expand the first range into a second range that encompasses the respective deflection angles of all the DOEs.

19. The method according to claim 13, wherein driving the second acousto-optic deflector comprises scanning the output axis so that the diffracted beams impinge on multiple different points on the target.

20. The method according to claim 13, wherein selecting the frequency of the drive signal comprises applying the drive signal at two or more frequencies simultaneously, which causes the acousto-optic device to split the beam into two or more sub-beams at the respective deflection angles of two or more of the DOEs.

21. The method according to claim 20, wherein deflecting the diffracted beam comprises recombining the sub-beams to impinge together along the common output axis on the target after diffraction from the DOEs.

22. The method according to claim 21, wherein applying the drive signal comprises varying a phase difference between the two or more frequencies so as to adjust a temporal intensity profile of the recombined sub-beams.

23. The method according to claim 21, wherein applying the drive signal comprises varying respective amplitudes of the two or more frequencies in the drive signal so as to adjust a temporal intensity profile of the recombined sub-beams.

24. The method according to claim 13, wherein selecting the frequency comprises switching the frequency of the drive signal, so as to switch an angle of deflection of the beam among the DOEs, within a switching time that is less than 10 µs.

25. An optical apparatus, comprising:
   a laser, which is configured to emit a beam of coherent optical radiation at a specified wavelength along a beam axis;
   an acousto-optic device, which is configured to intercept and selectably deflect the beam over a range of angles relative to the beam axis, wherein the acousto-optic device is a first acousto-optic deflector;
   a drive circuit, which is coupled to apply to the acousto-optic device a drive signal at two or more frequencies simultaneously, so as to cause the acousto-optic device to split the beam into two or more sub-beams at different, respective deflection angles and to deflect the beam selectably toward each of a plurality of deflecting elements;
   a plurality of deflecting elements, which are positioned to receive the sub-beams at the different, respective deflection angles within the range and to direct the sub-beams toward a common intersection point; and
   beam-combining optics, which are configured to receive the sub-beams at the common intersection point from the deflecting elements and to recombine the sub-beams into an output beam, which impinges along a common output axis on a target, wherein the beam-combining optics comprise a second acousto-optic deflector, which is driven in synchronization with the first acousto-optic deflector to deflect the sub-beams in a direction along the common output axis.

26. The apparatus according to claim 25, wherein the drive circuit is configured to adjust a temporal intensity profile of the recombined sub-beams by varying a phase difference between the two or more frequencies.

27. The apparatus according to claim 25, wherein the drive circuit is configured to adjust a temporal intensity profile of the recombined sub-beams by varying respective amplitudes of the two or more frequencies in the drive signal.

28. The apparatus according to claim 25, wherein the drive circuit is configured to adjust a temporal intensity profile of the recombined sub-beams by switching the frequencies of the drive signal, so as to switch the deflection angles of the sub-beams.

29. The apparatus according to claim 25, wherein the deflecting elements comprise diffractive optical elements (DOEs).

* * * * *